(12) United States Patent
Rinkiö

(10) Patent No.: US 9,891,052 B2
(45) Date of Patent: Feb. 13, 2018

(54) MICROMECHANICAL GYROSCOPE STRUCTURE

(71) Applicant: MURATA MAMUFACTURING CO., LTD., Nagaokakyo-shi, Kyoto (JP)

(72) Inventor: Marcus Rinkiö, Rajamäki (FI)

(73) Assignee: MURATA MANUFACTURING CO., LTD., Kyoto (JP)

( * ) Notice: Subject to any disclaimer, the term of this patent is extended or adjusted under 35 U.S.C. 154(b) by 161 days.

(21) Appl. No.: 14/943,066

(22) Filed: Nov. 17, 2015

(65) Prior Publication Data

US 2016/0187137 A1  Jun. 30, 2016

(30) Foreign Application Priority Data

Dec. 29, 2014  (FI) ...................... 20146153

(51) Int. Cl.
*G01C 19/5712* (2012.01)
*G01C 25/00* (2006.01)

(52) U.S. Cl.
CPC ......... *G01C 19/5712* (2013.01); *G01C 25/00* (2013.01)

(58) Field of Classification Search
CPC .......................... G01C 19/5712; G01C 25/00
See application file for complete search history.

(56) References Cited

U.S. PATENT DOCUMENTS

| 8,104,343 | B2 | 1/2012 | Klemetti et al. |
| 2006/0156813 | A1 | 7/2006 | Blomqvist |
| 2006/0156814 | A1 | 7/2006 | Blomqvist |

(Continued)

FOREIGN PATENT DOCUMENTS

| CN | 101120232 A | 2/2008 |
| EP | 1 174 684 A2 | 1/2002 |

(Continued)

OTHER PUBLICATIONS

Zhao KE, et al., "Suppressing the Mechanical Quadrature Error of a Quartz Double-H Gyroscope Through Laser Trimming", Chin. Phys. B vol. 22, No. 11, 2013, pp. 117901-1-117901-7.
International Search Report application No. PCT/B2015/059910 dated Mar. 18, 2016.
Finnish Search Report dated Aug. 17, 2015 corresponding to Finnish Patent Application No. 20146153.

(Continued)

*Primary Examiner* — David Bolduc
(74) *Attorney, Agent, or Firm* — Squire Patton Boggs (US) LLP

(57) ABSTRACT

A microelectromechanical gyroscope structure, and a method for manufacturing a microelectromechanical gyroscope structure, comprising a seismic mass and a spring structure suspending the seismic mass to a body element with a suspension structure. The spring structure allows a primary oscillation motion about a primary axis that is aligned with the plane of the seismic mass, and a secondary oscillation motion where at least part of the seismic mass moves in a second direction, perpendicular to the direction of the primary oscillation motion. The spring structure is attached to the seismic mass at both sides of the suspension structure and said spring structure is in torsional motion about the primary axis that is common with the primary oscillation motion. The structure of the gyroscope enables mechanical compensation of a quadrature error of the seismic mass by etching a compensation groove on the top face of the seismic mass.

18 Claims, 6 Drawing Sheets

(56) References Cited

U.S. PATENT DOCUMENTS

| | | |
|---|---|---|
| 2006/0272411 A1 | 12/2006 | Acar et al. |
| 2007/0220973 A1 | 9/2007 | Acar |
| 2008/0314144 A1* | 12/2008 | Blomqvist .......... G01C 19/5762 73/504.12 |
| 2009/0165553 A1* | 7/2009 | Klemetti ............ G01C 19/5712 73/504.04 |
| 2010/0095768 A1 | 4/2010 | Acar et al. |
| 2011/0041609 A1* | 2/2011 | Clark .................... G01P 15/097 73/514.29 |
| 2012/0085168 A1 | 4/2012 | Klemetti et al. |
| 2013/0047726 A1* | 2/2013 | Lin ..................... G01C 19/5712 73/504.12 |
| 2014/0361348 A1* | 12/2014 | Yoneoka ............ G01C 19/5762 257/254 |
| 2015/0068308 A1* | 3/2015 | Blomqvist ............ B81B 7/0058 73/504.12 |

FOREIGN PATENT DOCUMENTS

| | | |
|---|---|---|
| EP | 1 783 094 A1 | 5/2007 |
| EP | 2 378 246 A1 | 10/2011 |
| TW | 201408991 A | 3/2014 |
| WO | WO 2008/145823 A1 | 12/2008 |
| WO | 2015/036924 A1 | 3/2015 |

OTHER PUBLICATIONS

Taiwanese Search Report application No. 104135393 dated Aug. 24, 2016.

* cited by examiner

MICROMECHANICAL GYROSCOPE STRUCTURE

BACKGROUND

Field

The present invention relates to measuring devices and especially to a gyroscope structure, as defined in the preamble of independent claim 1, and to a method for manufacturing a gyroscope structure, as defined in the preamble of independent claim 11. The present invention further relates to an improved gyroscope structure and more particularly to a structure enabling quadrature error compensation in a gyroscope, and to an improved method for manufacturing a gyroscope structure enabling use of mechanical quadrature error compensation in a gyroscope.

Description of the Related Art

Micro-Electro-Mechanical Systems, or MEMS can be defined as miniaturized mechanical and electro-mechanical systems where at least some elements have a mechanical functionality. Since MEMS devices are created with the same or similar tools used to create integrated circuits, micromachines and microelectronics can even be fabricated on the same piece of silicon.

MEMS structures can be applied to quickly and accurately detect very small changes in physical properties. For example, a microelectronic gyroscope can be applied to quickly and accurately detect very small angular displacements.

Motion has six degrees of freedom: translations in three orthogonal directions and rotation around three orthogonal axes. The latter can be measured by an angular rate sensor, also known as gyroscope. In MEMS gyroscopes, Coriolis Effect is used to measure angular rate. When a mass is moving in one direction called the primary motion and rotational angular velocity is applied, the mass experiences a force in orthogonal direction as a result of the Coriolis force. Resulting physical displacement caused by the Coriolis force may be then read from, for example, a capacitive, piezoelectrical or piezoresistive sensing structure. The displacement due to the Coriolis Effect may also be called sense mode. The primary motion may alternatively be called primary mode or drive mode.

In MEMS gyroscope, mechanical oscillation is used as the primary motion. When an oscillating gyroscope is subjected to an angular motion orthogonal to the direction of the primary motion, an undulating Coriolis force results. This creates a secondary oscillation, also referred to as the sense mode, orthogonal to the primary motion and to the axis of the angular motion, and at the frequency of the primary oscillation. The amplitude of this coupled oscillation can be used as the measure of the angular rate, i.e. the absolute value of angular velocity.

In an ideal gyroscope, the drive mode movement and the sense mode movement are perfectly orthogonal, so that without the Coriolis force, the sense mode is not excited. However, in practical implementation of a MEMS gyroscope, the device is not necessarily quite optimal or symmetric. In many cases, this is caused by the un-ideal features in the manufacturing process. In example, some etched walls may not be perfectly vertical but may become angled, or material layer thickness may vary slightly. Then, the drive mode may not be perfectly aligned with the primary axis. This kind of unintended direction component in the movement of the primary resonator is referred to as quadrature error.

Quadrature error may be compensated in example by physically trimming the resonator element. This type of compensation is often used for piezoelectric gyroscopes. Compensation may also comprise electrical tuning, actively tuning electrical spring forces in parallel plate capacitors. This type of compensation is often used in silicon gyroscopes. Further, the effects of quadrature error may be alleviated through design of the gyroscope, particularly by design of the springs. U.S. Pat. No. 8,104,343 presents use of compensation grooves etched into a spring structure to alleviate unwanted coupling caused by a non-ideality. Different compensation methods may be used separately, or in a combination suitable for the specific implementation.

US patent application publication US2006/0156814 presents a micromechanical sensor of angular velocity which has two pairs of springs each arranged for allowing one of the two perpendicular oscillation motions, and a frame structure connecting said pairs of springs.

SUMMARY

According to a first aspect of the invention, there is a microelectromechanical gyroscope structure, comprising a seismic mass and a primary spring structure suspending the seismic mass to a body element with a suspension structure. The primary spring structure allows a primary oscillation motion where at least part of the seismic mass rotary oscillates in a first direction about a primary axis that is aligned with the plane of the seismic mass and a secondary oscillation where at least part of the seismic mass moves in a second direction that is perpendicular to the first direction. The primary spring structure is attached to the seismic mass on the opposite sides of the suspension structure and said primary spring structure is configured for torsional motion about the primary axis that is common with the primary oscillation motion.

According to a second aspect of the invention, a quadrature error of the seismic mass is mechanically compensated with at least one compensation groove on the face of the seismic mass, which face is away from the body element. The at least one compensation groove is positioned at a predefined distance from either end of the primary spring structure.

According to a third aspect of the invention, the at least one compensation groove is formed as elongated quadrangle shape, orthogonal to the primary axis.

According to a fourth aspect of the invention, the at least one compensation groove extends predefined distances away from the primary axis at opposite sides of the primary axis, wherein the predefined distances are essentially equal to each other or wherein the predefined distances are different from each other.

According to a fifth aspect of the invention, the depth of the compensation groove within the seismic mass is defined as portion of the thickness of the primary spring structure.

According to a sixth aspect of the invention, a depth of the compensation groove is essentially half of the thickness of the primary spring structure.

According to a seventh aspect of the invention, a depth of the compensation groove is different on different sides of the primary axis.

According to an eighth aspect of the invention, the quadrature error is further electrically compensated using at least one electrical quadrature compensation structure placed near an end of the seismic mass away from the primary axis of the seismic mass.

According to a ninth aspect of the invention, the gyroscope device comprises at least two microelectromechanical gyroscope structures attached to a common body element, the at least two gyroscope structures having a common primary axis.

According to a tenth aspect of the invention, the primary spring structure is double-ended, and the parts of the primary spring structure are attached to the suspension structure on the opposite sides of the suspension structure.

According to another aspect, there is provided a method of manufacturing a microelectromechanical gyroscope structure. The structure comprises a seismic mass and a primary spring structure suspending the seismic mass to a body element with a suspension structure to allow a primary oscillation motion where at least part of the seismic mass rotary oscillates in a first direction about a primary axis that is aligned with the plane of the seismic mass. The structure also allows a secondary oscillation where at least part of the seismic mass moves in a second direction that is perpendicular to the first direction. The manufacturing method comprises creating the primary spring structure that is attached to the seismic mass on the opposite sides of the suspension structure, and said primary spring structure is configured for torsional motion about the primary axis that is common with the primary oscillation motion.

According to another aspect, the method comprises creation of at least one compensation groove for mechanically compensating a quadrature error of the seismic mass. The compensation groove is on the face of the seismic mass that is exposed to the main processing steps and away from the body element.

According to another aspect, the method comprises creation of the at least one compensation groove positioned at a predefined distance from either end of the primary spring structure. According to yet another aspect, the compensation groove is formed as elongated quadrangle shape, orthogonal to the primary axis of the primary oscillation motion.

According to another aspect, the compensation groove extends predefined distances away from the primary axis at opposite sides of the primary axis, wherein the predefined distances are essentially equal to each other or wherein the predefined distances are different from each other.

According to another aspect, the depth of the compensation groove within the seismic mass is defined as portion of the thickness of the primary spring.

According to another aspect, the depth of the compensation groove is half of the thickness of the primary spring.

According to another aspect, the depth of the compensation groove is different on different sides of the primary axis.

According to another aspect, the compensation groove is created with a process performed only on the face of the seismic mass that is away from the body element.

According to another aspect, etching of the compensation groove comprises at least one common etching phase with the etching of the seismic mass structure and/or the primary spring structure and/or a sensing comb structure and/or an electrical compensation structure.

According to another aspect, a method for manufacturing a micromechanical gyroscope is provided, wherein at least two microelectromechanical gyroscope structures are created, wherein said gyroscope structures are attached to the same body element and have a common primary axis.

Embodiments of the present invention are based on the idea of using double-ended primary springs. Term double-ended means that the primary springs comprise two parts which are attached to the suspension structure on opposite sides of the suspension structure. This arrangement has an advantage that it enables efficient mechanical compensation of the quadrature error independent of the direction of the quadrature error by having quadrature error compensation grooves on top face of the primary seismic elements. Top face is understood to comprise of the uppermost layers of the structure on the side from which the main manufacturing process steps of MEMS gyroscope device such as etching are performed, i.e. the face of the device silicon that is away from the supporting structure such as a handle wafer or a cap wafer.

By introducing the double-ended primary springs allowing both the primary and the secondary movement for the seismic masses, the number of moving parts of the micromechanical gyroscope may be reduced, which is advantageous also since a simple structure is less likely to be subject to unwanted parasitic oscillation modes.

The quadrature error compensation achieved by the mechanical compensation may be further complemented by introducing electrical quadrature error compensation.

BRIEF DESCRIPTION OF THE DRAWINGS

In the following, embodiments of the invention will be described in greater detail, with reference to the attached drawings, in which FIG. 1 describes a gyroscope structure.

DETAILED DESCRIPTION

The following embodiments are exemplary. Although the specification may refer to "an", "one", or "some" embodiment(s), this does not necessarily mean that each such reference is to the same embodiment(s), or that the feature only applies to a single embodiment. Single features of different embodiments may be combined to provide further embodiments.

In the following, features of the invention will be described with a simple example of a device architecture in which various embodiments of the invention may be implemented. Only elements relevant for illustrating the embodiments are described in detail.

Various implementations of gyroscope structures that are generally known to a person skilled in the art may not be specifically described herein.

Figure 1:
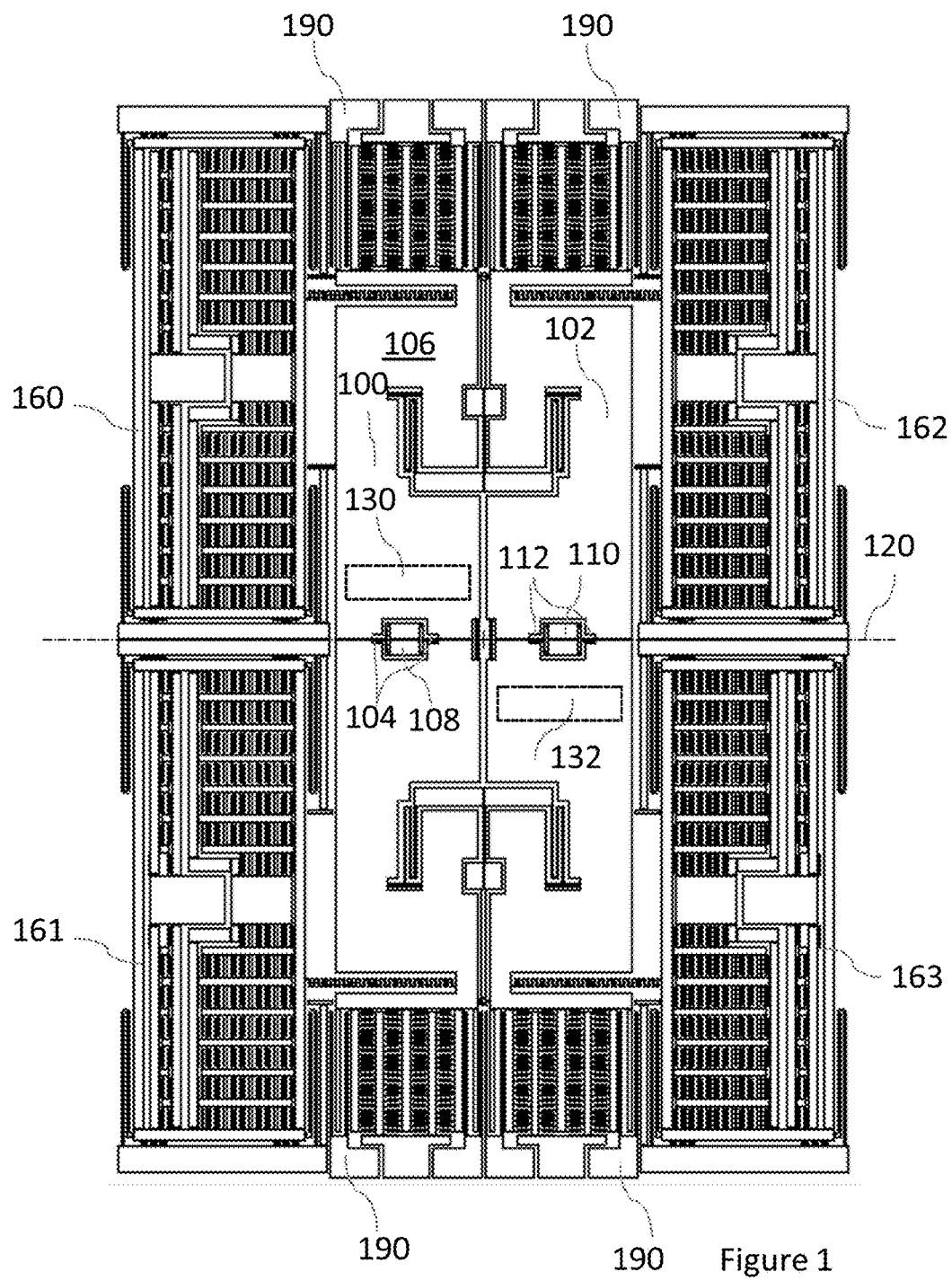

The FIG. 1 shows an exemplary gyroscope structure. The gyroscope structure includes a first seismic mass 100 and a second seismic mass 102. The term seismic mass refers here to a mass body that may be suspended to a base to provide an inertial movement. The first seismic mass 100 and the second seismic mass 102 may have a planar form. This means that at least part of the volume of the seismic masses 100, 102 extends along a plane in two dimensions (length, width) and forms therein a planar surface. Within tolerances, the planar surface of the seismic mass 100, 102 can be considered to contain all straight lines that connect any two points on it. It is, however, understood that the surface may include minor protrusions patterned on the seismic mass, or recesses patterned into the seismic mass. The plane of masses 106 forms a reference plane formed by the planar surfaces of the seismic masses 100, 102 suspended at their initial designed position, when no added external forces act upon them. Similarly, the plane of mass of a single planar surface (100 or 102) is the reference plane of the mass in its initial designed position, when no added external force act upon it. It is understood that under varying conditions and during operation of the gyroscope, the seismic masses, as such, may later move and/or deform out of the plane of masses 106.

The gyroscope structure includes also a first primary spring structure 104 for suspending the first seismic mass 100 and a second primary spring structure 112 for suspending the second seismic mass 102 to a body element of the gyroscope. The body element may be provided, for example, by an underlying handle wafer, or a covering cap wafer of a gyroscope die. It is noted that the divisions to a structure wafer, the handle wafer and the cap wafer are conceptual. For a person skilled in the art it is clear, for example, that the handle wafer and the structure wafer may be patterned separately or in combination from a layered silicon-insulator-silicon substrate. The first primary spring structure 104 and the second primary spring structure 112 may be configured to suspend the first seismic mass 100 and the second seismic mass 102 correspondingly into a parallel position such that the planar surfaces of the first seismic mass 100 and the second seismic mass 102 form a plane of masses 106.

As shown in FIG. 1, the elements of the first primary spring structure 104 are advantageously patterned into the volumes of the first seismic mass 100 and the second seismic mass 102. The first primary spring structure 104 may comprise or may be attached to a first suspension structure 108 within the plane of the first seismic mass. Similarly, the second seismic mass 102 may comprise or may be attached to a second suspension structure 110 within the plane of the second seismic mass with the second primary spring structure 112. Although the primary spring structures 104, 112 appear to comprise two parts on opposite sides of the respective suspension structure 108, 110, each of the primary springs 104, 112 should be understood to be a single combined element comprising multiple structural parts. The first primary spring structure 104 is understood to be aligned with the plane of the first seismic mass 100, and the second primary spring structure 112 is to be aligned with the plane of the second seismic mass. With term double-ended it's indicated that the primary spring structures 104, 112 are arranged on two opposite sides of the respective suspension structure 108, 110 so that each of the seismic masses 100, 102 is attached to the respective primary spring structure 104, 112 in at least two attachment points located on opposite sides of the respective suspension structure 108, 110, and that each of the suspension structures 108, 110 is attached to the respective one of the primary spring structures 104, 112 in at least two attachment points located on the opposite sides of the suspension structure. Number of attachment points between the primary spring structures 104, 112 and the respective suspension structures 108, 110 on each side of the suspension structure may vary according to primary spring design. In the current example, primary spring structures 104, 112 are attached to the respective suspension structures 108, 110 on two different locations on both sides of the suspension structure, and the primary spring structures 104, 112 are attached to the respective seismic masses 100, 102 at one location on both sides of the respective suspension structure 108, 110. Attaching of the primary spring structures 104, 112 to the respective seismic mass 100, 102 and/or to the respective suspension structure 108, 110 at locations on the primary axis 120 facilitates a well-balanced rotating motion. Alternatively, multiple attachment locations may be chosen, in which case the attachment locations of the primary springs 104, 112 may be selected symmetrically on opposite sides of the primary axis 120.

In addition to the mechanical quadrature compensation elements according to the invention, the gyroscope structure may additionally include one or more electrical quadrature compensation elements 190. Examples of such electrical quadrature compensation elements are known to a man skilled in the art. The electrical quadrature compensation elements may be used to compensate the quadrature error remaining after the mechanical quadrature compensation according to the invention has been applied, or the two may be used to complement each other. In the exemplary gyroscope structure of FIG. 1, each of the seismic masses 100, 102 has a planar form that extends rectilinearly in the direction of the plane of masses, and the primary oscillation is rotary oscillation of the seismic mass about the common primary axis 120, in other words, the primary axis of seismic mass 100 and the primary axis of seismic mass 102 are aligned with the common primary axis 120. The common primary axis 120 is parallel to the two opposite sides of each of the seismic masses 100, 102 and divides them into two parts. In order to maximize the compensating force to a seismic mass 100, 102, an electrical compensating element 190 may be arranged to an end part of the seismic mass 100, 102. In an end of the seismic masses the distance to the primary axis is the largest, which results correspondingly to the maximum amplitude of the primary motion and thereby to the maximum control of the compensating force. Electrical capacitance between the seismic mass and the electrical compensating element may be adjusted to compensate the quadrature error. When the out-of-plane primary motion is not rotary oscillation, the location of the compensating element is not relevant in this aspect.

The sensor structure also includes excitation device or excitation means that are configured to drive the first seismic mass 100 and the second seismic mass 102 to oscillate about the common primary axis 120. This common primary axis 120 is aligned with the plane of the masses 106. The first excitation means may include a first mass electrode 130 that is configured to move with the first seismic mass 100, and a second mass electrode 132 that is configured to move with the second seismic mass 102. The electrodes 130, 132 may interact electrically with an electrode or electrodes in the cap or the substrate, and as a result of this electrical interaction induce their respective seismic masses 100, 102 into rotary oscillation of about the common primary axis 120. The opposite ends of the seismic masses move in a seesaw type of movement in relation to the common primary axis 120. The primary springs 104, 112 may be essentially aligned with this common primary axis 120, meaning that at least the part of the primary springs 104, 112 allowing the spring a torsional motion about the primary axis 120 may be aligned with this common primary axis 120. Number of excitation electrodes may vary according to design of the sensor. At least one excitation electrode is needed for each seismic mass.

In example, the first excitation is caused by an electrode where the seismic mass itself is formed of conductive material and interacts with the stator electrodes 130, 132 (projections of the conductors shown in FIG. 1) inside the cap. It is understood that other positions and other excitation structures capable of creating the specified out-of-plane directed excitation force to a seismic mass may be applied within the scope. For example, a first mass electrode may be configured to move with the first seismic mass 100, and a second mass electrode may be configured to move with the second seismic mass 102. The electrodes may be configured to interact electrically with an electrode or electrodes attached to the cap or the substrate, and as a result of this electrical interaction induce their respective seismic masses 100, 102 into rotary oscillation about the common primary axis 120. Also piezoelectrical excitation may be applied. Other corresponding structures are well known to a person skilled in the art, and will not be discussed in detail herein.

For purpose of sensing mode detection, the gyroscope structure contains sensing comb structures 160-163, placed on the sides of the seismic masses. In the presented embodiment, the sensing combs form a double differential comb arrangement. The arrangement for sensing combs is known by a person skilled in the art, and it can vary from the design presented in this exemplary figure without departing from the scope of this invention.

While we consider the spring structures 104 and 112 and the suspension structures 108 and 110 being on the primary axis 120, it should be noted that a spring structure and/or a suspension structure is typically a mechanical structure which may extend in all three dimensions around the primary axis. We may consider a spring and/or an suspension structure being aligned with the primary axis when, in a selected projection, the center of weight or center of gravity of the spring and/or the suspension structure is on the primary axis within the distance enabled by the manufacturing process accuracy, i.e. that the center of weight or center of gravity is intended to be on the primary axis in the selected projection. This projection may preferably be in the plane of the seismic masses 106.

Figure 2A:
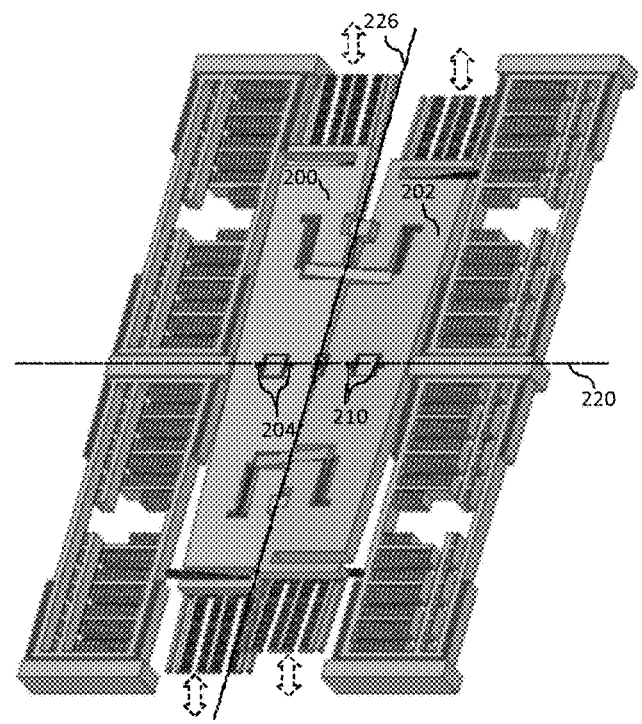
FIG. 2a describes primary motion of a gyroscope structure.

FIG. 2a describes a primary motion of an exemplary, simplified gyroscope element. A number of driving elements (not shown) placed along sides of the primary axis 220 cause a swinging motion of the seismic masses 200, 202 about the primary axis 220. The number and shape of the driving elements may vary according to implementation. Each seismic mass 200, 202 has at least one driving element causing the primary movement. The swinging movement is enabled by primary springs 204 and 210 placed along and aligned with the primary axis 220 of the primary movement. This movement may also be called as the primary oscillation movement or primary oscillation motion. While the seismic masses are in primary motion, the movement of each of the double-ended primary springs 204 and 210 can be considered as torsional motion. In order to facilitate this primary motion, the primary springs 204 and 210 are configured at least for torsional motion. Each of the springs is subjected to twisting around its longitudinal axis, common with the main axis 220, by torque applied to it by the moving seismic mass, while the suspension structure attached to the spring is in fixed position. The springs, which may be at least partially formed as a torsion bars, exert force in the direction opposite to the external torque. This force is proportional to the amount/angle the spring is twisted. It should be noted that the movement presented in the exemplary FIG. 2a has been exaggerated for illustrative purposes, and the actual movement of the seismic masses may be smaller. The dashed two-ended arrows further illustrate the oscillating motion of the ends of the seismic masses during primary oscillation motion. In the current example, there are two seismic masses 200, 202, and the relative motion of these two seismic masses during the primary movement is in substantially opposite phase.

Figure 2B:
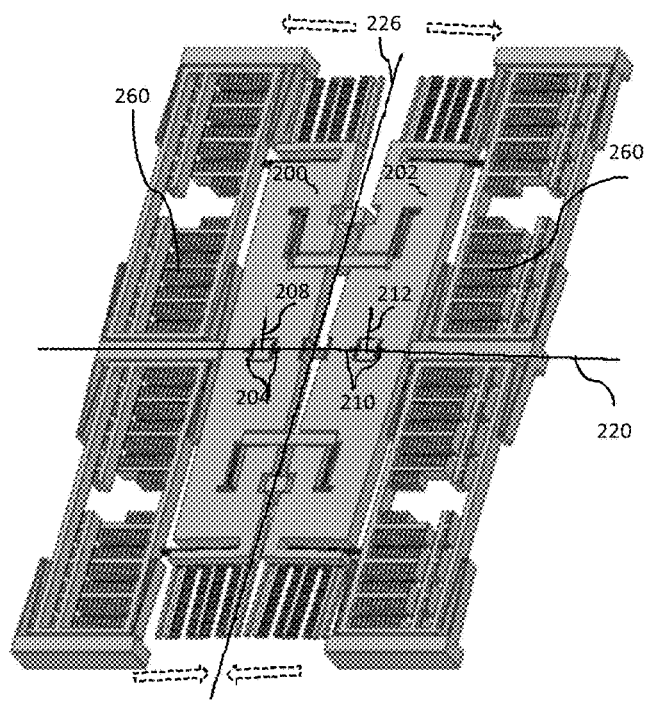
FIG. 2b describes detection motion of a gyroscope structure.

FIG. 2b describes a detection motion of an exemplary, simplified gyroscope element. When angular velocity is applied to the gyroscope element in primary motion, the primary masses are affected by a Coriolis force, which forces the masses to move in a direction different from the primary motion. In this case, this secondary movement or sensing mode movement is caused in the plane of the seismic masses as an opposite phase angular oscillation about the suspension structures of the seismic masses, located at the detection axes 208 and 212, attaching the seismic masses to the supporting body of the sensor element. We may also call this movement as secondary oscillation movement or secondary oscillation motion. It can also be referred to as each of the seismic masses 200, 202 has a sensing movement about their own sensing axes 208, 212 crossing the plane of the masses at the respective suspension structure, wherein the sensing axis is perpendicular to the plane of the masses, as described in more detail in relation to FIG. 1. The sensing axis direction can also be considered as the direction parallel to the z-axis in the device, in other words, out of the plane of the device. This rotation motion about the sensing axis may be detected with double differential combs 260 placed on opposite sides of the seismic masses.

The first primary spring 204 enables also rotary oscillation of the first seismic mass 200 about a first detection axis 208 that crosses the plane of the first seismic mass 200 and is perpendicular to the plane of masses. Correspondingly, the second primary spring 210 enables also rotary oscillation of the second seismic mass 202 about a second detection axis 212 that is perpendicular to the plane of masses. In the exemplary case of beam-formed springs, the beam spring undergoes in-plane bending and thereby facilitates the in-plane rotary oscillation of the respective seismic mass. Thus, the primary springs are configured both for torsional motion and for bending motion. The first detection axis 208 and the second detection axis 212 are separated from each other by a non-zero distance. Advantageously the detection axes 208, 212 are symmetrically positioned in respect of a centerline 226 between the seismic masses 200, 202. In the exemplary setting, the detection axes 208, 212 are positioned along the primary axis 220 of the primary motion.

While the seismic masses are in secondary oscillation in opposite phase, they appear to move away from each other in one end of the structure and move towards each other in the other end of the structure. This detection motion is further illustrated by the dashed arrows on top and bottom of the seismic masses, indicating direction of movement in one phase of the rotating secondary oscillation. In other phase, the directions will be opposite to the ones shown. It should be noted, that the movement, especially the movement of the seismic masses 200, 202 and the differential combs 260 has been exaggerated in this figure for illustrative purposes, and the actual movement may be smaller.

Figure 3A:
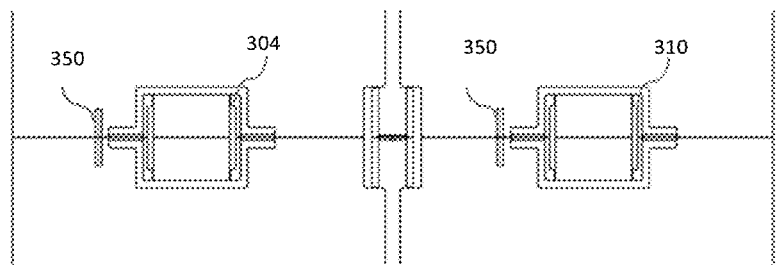
FIGS. 3a, 3b, 3c, 3d and 3e describe mechanical quadrature compensation grooves etched next to the ends of the primary springs.
Figure 3B:
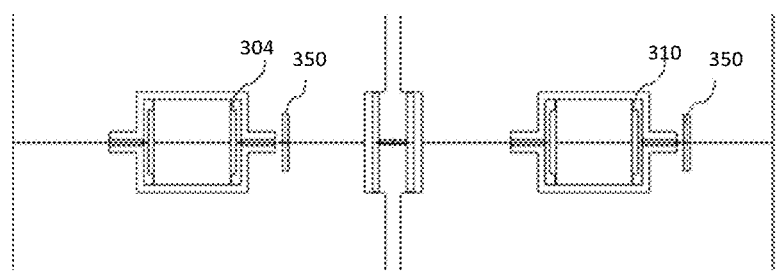
Figure 3C:
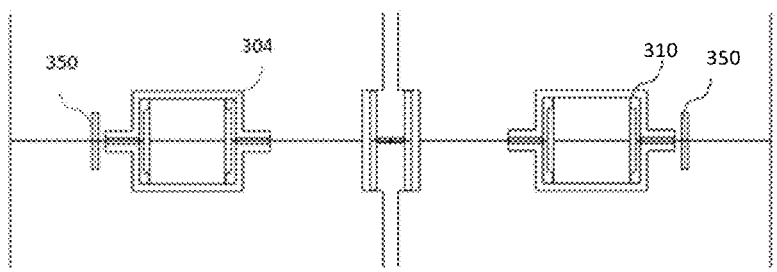
Figure 3D:
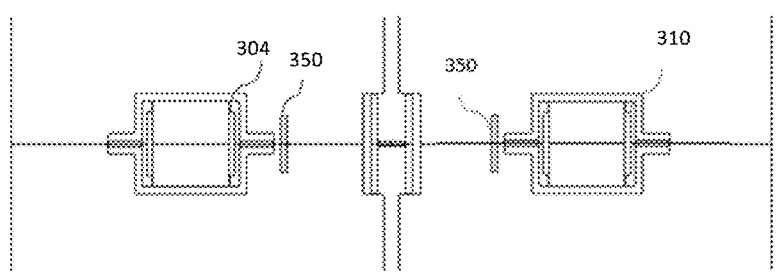
Figure 3E:
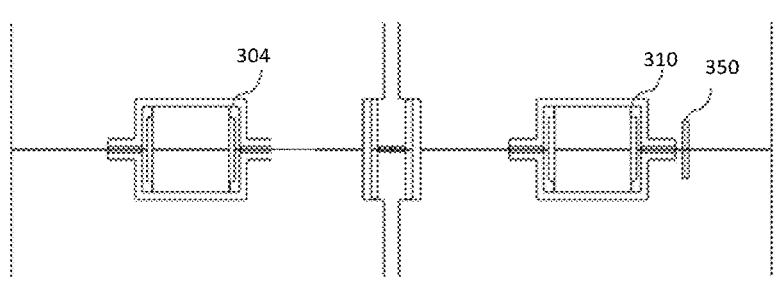

FIGS. 3a-3e describe top view of the placement of mechanical quadrature compensation grooves 350 etched near the ends of the primary springs (304, 310). A groove should be understood as a long and narrow depression formed on a face of a material. There are several alternatives how to place the compensation grooves, depending on the direction of the quadrature error in the primary motion. Each groove is designed to compensate the quadrature error of the specific seismic mass. While the gyroscope is rather small device compared to the wafer on which the gyroscope is built on, the manufacturing process often creates like unidealities in both seismic masses of a specific gyroscope device, and therefore the grooves may be placed to the same side, i.e. right or left side of each spring correspondingly as shown in FIGS. 3a and 3b. Alternatively, only a single compensation groove is created to just one of the seismic masses, while the other mass may be left without a compensation groove. An example of this alternative is shown in FIG. 3e. Further, the two seismic masses may have compensation grooves placed on different sides of each spring element, in example on inner side, towards the geometric symmetry line of the gyroscope device, away from the sensing comb structure and between the two strings as shown in FIG. 3d, or on outer side, towards the sensing comb structure, away from the geometric symmetry line of the gyroscope device as in FIG. 3c. A compensation groove may be an elongated quadrangle-like shaped groove. The corners or the ends of the groove may be sharp or rounded by design or due to manufacturing steps, without departing from the scope of the invention, and the walls may be inclined in example due to non-ideal features of the manufacturing process. Preferably, the compensation groove 350 is placed in the seismic mass orthogonal to the primary axis of the primary motion in the plane of the seismic mass and at a predefined distance from the chosen end of the primary spring (304, 310) attached to the seismic mass. The compensation groove 350 may extend to both, opposite sides of the primary axis of the primary motion along the face of the seismic mass, which face is away from the supporting body structure. Further, the compensation groove 350 may extend an equally long distance away from the primary axis on both, opposite sides of the primary axis, or it may extend a different distance away from the primary axis on each opposite side of the primary axis. Further, although not shown in the figure, multiple compensation grooves may be created in a single seismic mass near to the same end of the spring, next to each other.

Figure 4A:
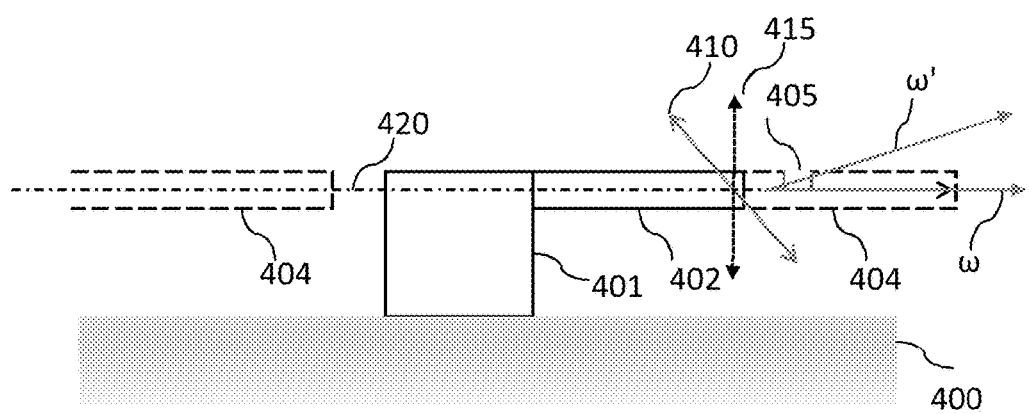
FIGS. 4a, 4b and 4c present cross-sections of a gyroscope structure along the primary axis.
Figure 4B:
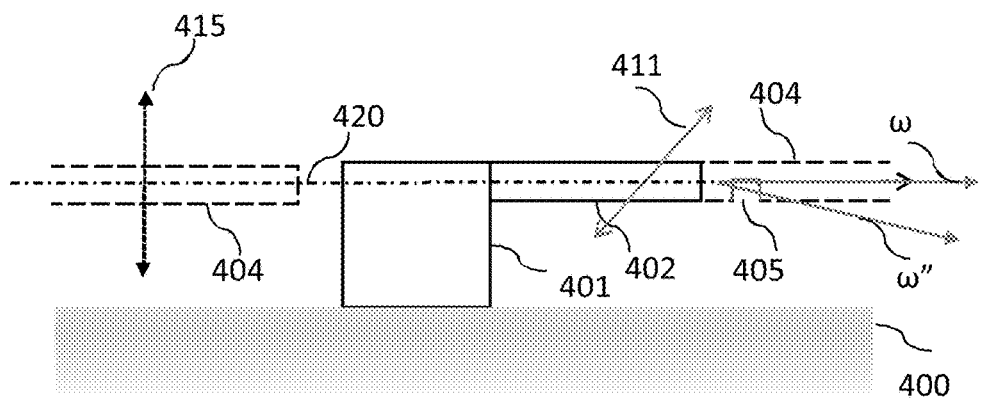
Figure 4C:
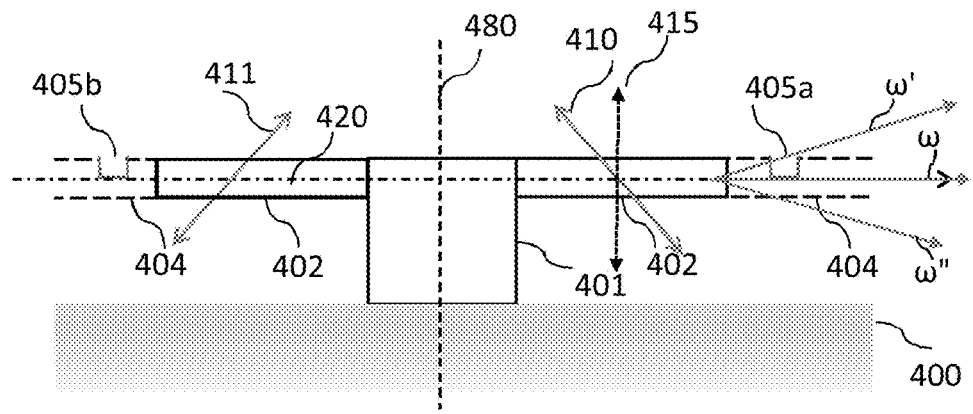

FIGS. 4a, 4b and 4c present cross-sections of a gyroscope element along the primary axis. The suspension structure 401 is attached to the supporting structure 400. The spring element 402 connects the suspension structure to the seismic mass 404, enabling the seismic mass 404 to move in relation to the suspension structure 401. The intended rotary primary movement around the spring element 402 occurs in plane orthogonal to the direction of the primary axis. The intended direction of the main rotary motion may be presented by the angular velocity vector w. The projection of the primary rotation motion in the plane of the cross-section may also be described by the dotted, two-end arrow 415. The direction of the primary axis of primary rotary motion 420 about which the primary motion occurs is shown horizontally. It should be noted that the structures in FIGS. 4a to 4c are for illustrative purposes only, and not in scale.

FIG. 4a presents an example of correction of quadrature error with a single-ended spring. Term single-ended spring refers to an arrangement where the spring 402 is attached to the suspension structure 401 and to the seismic mass 404 only on one side of the suspension structure as illustrated. Due to non-ideal capacities in the manufacturing process, the swinging motion of the seismic mass 404 may also have an unintended quadrature error, a movement which is tilted from the intended direction from the primary movement. This is described by the arrow 410, indicating the direction of the unwanted quadrature error, and with the angular velocity vector w'. In practical systems, the quadrature error of an uncompensated device may have amplitude clearly greater than the amplitude of the sense mode movement caused by Coriolis force. Although this movement has 90 degrees phase difference from the Coriolis force, so that the error could even be corrected by later signal processing of the sensed signals, presence of the quadrature error causes often unreasonable requirements to the dynamic range requirements for amplifying the signals received from the sensing structure. Therefore, it's advantageous to compensate the quadrature error within the gyroscope device. In the presented type of gyroscope structure, major part of the quadrature error 410 can be compensated mechanically by manufacturing a compensation groove 405 in the seismic mass. A quadrature error with a direction indicated by the alternate angular velocity vector w' and/or the double-ended arrow 410, as shown in FIG. 4a), and it may be further described as a quadrature error with a negative angle when compared to the direction of the intended drive mode, or as a movement occurring in an angle counterclockwise from the intended primary movement, can be compensated by placing the compensation groove 405 on the side of the seismic mass which is away from the supporting structure of the gyroscope device. In the exemplary structure with a supporting structure forming the base, the compensation groove can be also indicated to be on the "top side" of the gyroscope seismic mass. It should be noticed that the direction of the arrow is only illustrative, and the exact direction of the quadrature error 410 according to this mode can have any angle between 0 to −90 degrees when compared to the direction of the primary movement. Further, the quadrature error may have additional rotation movement components along yet further axis of movement. The single, simple angle of deviation from intended primary movement is used here for simplicity.

FIG. 4b presents a further example of correction of quadrature error with a single-ended spring. In this case, the unintended quadrature error away from the primary axis with an exemplary direction as described with the angular velocity vector w" or with the double-ended arrow 411, as shown in FIG. 4b), and it may also be described as a quadrature error having a positive angle as compared to the direction of the intended drive mode, or a movement occurring in an angle clockwise from the intended direction of the primary movement, indicated by the angular velocity vector ω or with the double-ended arrow 411. Compensating the quadrature error mechanically requires now placing the compensation groove 405 on the side of the seismic mass 404 which is towards the [base] of the gyroscope device. In this example, where the supporting body of the device is shown as being "down", we may describe this as being the "bottom" or "support" side of the gyroscope seismic mass. From manufacturing point of view, this solution is however problematic. Compensation groove formation should happen from the bottom side of the seismic mass 404. For example, one possibility of achieving this is to do the compensation groove etching before the gyroscope element is attached to the supporting structure 400, since the etching process requires visibility of the surface on which the pattern can be etched. Additionally, this induces more strict requirements for the overlay of the later processing steps. It should be noticed that direction of the arrow is only illustrative, and the exact direction of the quadrature error 411 according to this mode can have any angle between 0 to 90 degrees when compared to the direction of the primary movement, and the quadrature error may even contain components in a third rotation direction. The single direction of unwanted movement is used here as an example for simplicity purposes.

FIG. 4c presents compensation of the quadrature error according to the present invention. Now a double-ended primary spring structure is used. With a double-ended primary spring, the seismic mass is supported on both, opposite sides of the suspending structure, and the attachment points of the spring and the seismic mass may be placed in any point along the primary axis. The two parts of the exemplary primary spring structure 402 are directly connected between the seismic mass and the suspending structure, so that the suspending structure is effectively located between the two parts of the primary spring. When quadrature error is to be mechanically compensated with a compensation groove, this can now be implemented by creating the compensation groove on a single face of the seismic mass, independent on the direction of the quadrature error to be compensated. In the exemplary case, with the supporting structure of the gyroscope device placed in the bottom, the compensation groove can be created on the top face of the device, on the side of the seismic mass which is away from the supporting body element. This top face of the device is exposed to the manufacturing process steps, such as placing a photoresist and etching or depositing a layer or material, even after the device has been attached to the body element. In case the quadrature error has a negative angle, described with angular velocity vector w', counterclockwise from the intended primary movement, the compensation groove 405a is created in similar manner as with a single-ended primary spring 402, next or near to the appropriate end of the primary spring 402, at a predefined distance from the end of the primary spring 402. When the quadrature error has a positive angle, described with an angular velocity vector w", clockwise from the intended primary movement, the compensation groove 405b is created next or near to the opposite end of the primary spring 402, at a predefined distance from the primary spring 402. It should be noted that the two presented placements of the compensation grooves 405a and 405b are primarily alternative to each other, since a compensation groove is typically needed only on one side of the primary spring 402 for one seismic mass 404 for a given quadrature error angle. This alternative characteristic is highlighted with the dashed line 480, indicating that the two sides of the picture may relate to a different embodiment. Further, it should be noticed that instead of creating a single compensation groove, a design with two or more compensation grooves placed near one end of a specific primary spring may apply, according to design preferences, without deviating from the scope of the invention. In an exemplary alternative implementation, the supporting structure may be placed on the top of the device or the device may be turned in any angle without deviating from the scope of the invention.

The compensation groove is preferably manufactured by an etching process. In example, DRIE etching may be used. In the exemplary gyroscope device, this etching of the compensation grooves can be advantageously done simultaneously with the etching of other structures, such as the seismic mass structure and/or the spring structure and/or a sensing comb structure and/or an electrical compensation structure, from the top side of the primary seismic mass, in other words, on the face of the seismic mass which is facing away from the body element. This creates a benefit by simplifying the manufacturing process as compared to need for occasionally creating compensation grooves on the bottom side of the seismic mass, in other words, on the face of the seismic mass which is facing towards the body element, if a one-ended primary spring is used as in prior art.

Figure 5A:
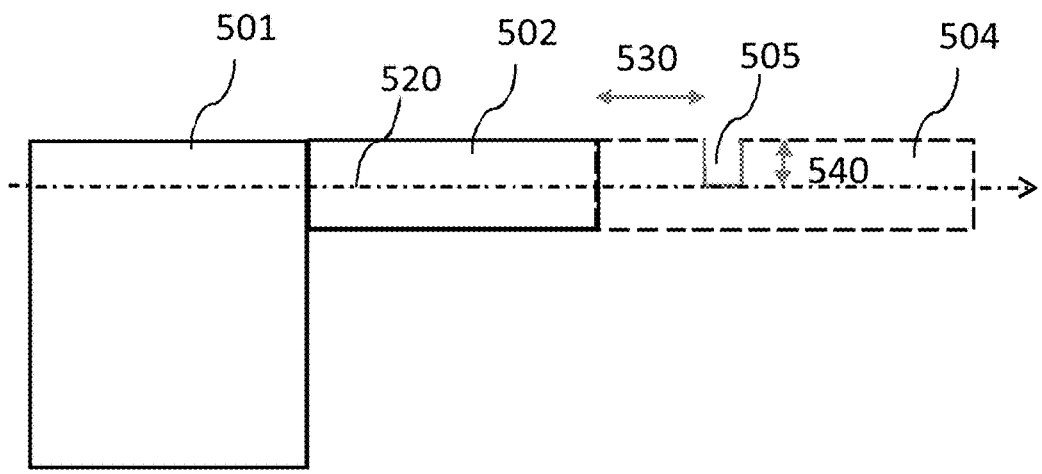
FIGS. 5a and 5b provide a schematic presentation of the effective design parameters of a compensation groove.
Figure 5B:
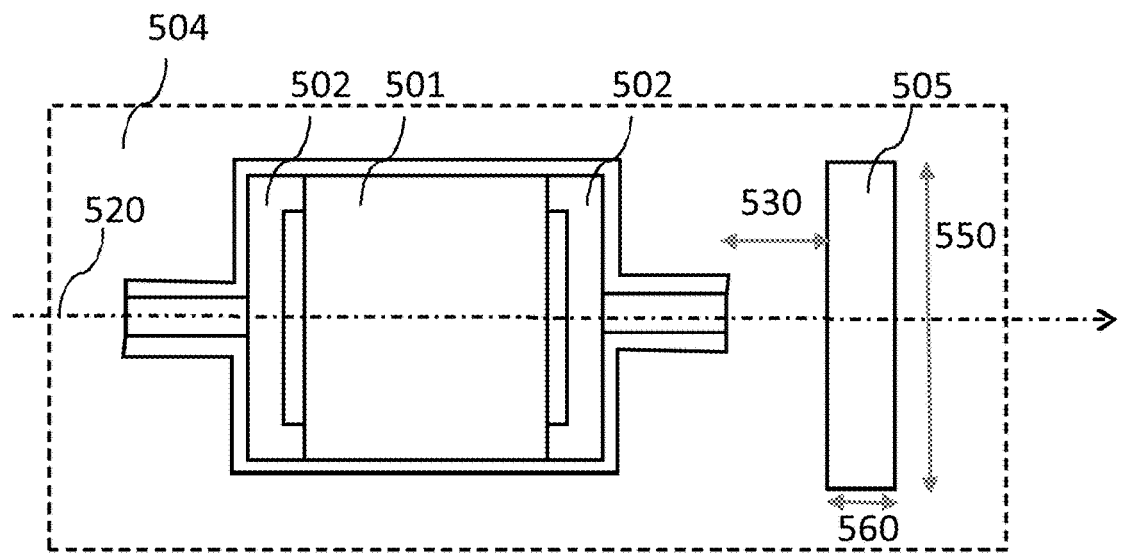

FIGS. 5a and 5b provide a schematic presentation of the effective design parameters of a compensation groove. A compensation groove may be an elongated line-like depression, which is placed relatively near to an end of the spring. There are several design parameters of designing the compensation groove, which each may have a corrective effect on the direction of the primary motion towards the intended primary movement direction, reducing the amount of quadrature error. It should be noted that the FIGS. 5a and 5b is for illustrative purposes only, and are not in scale.

FIG. 5a presents part of an illustrative of the rotary motion. The suspension structure 501 is connected to the main seismic mass 504 of the device by a spring 502. Only a part of the main seismic mass 504 is shown, and due to the illustrative nature of the figure, the structures may not necessarily be in scale. The most effective, and thus the most important parameter affecting to the amount of quadrature correction is distance of the groove 530 from the end of the primary spring. Another, slightly less important parameter is the depth of the compensation groove 540 within the seismic mass as compared to the thickness of the spring. The depth is adjusted during the manufacturing process, and it's most effective when the depth of the compensation groove is half of the thickness of the primary spring. Alternatively, another depth could be chosen for the compensation groove 540 as well, in example one third of the thickness of the spring. In a yet further embodiment, the depth of the compensation groove may vary along the length of the groove: it may be deeper in some locations and shallower in other locations. In example, the groove may be of one depth on one side of the primary axis and of another depth on the other side of the primary axis. It should be noticed that although roughly similar in this illustration, the relative thickness of the spring 502 and the seismic mass 504 may vary. While the seismic mass 504 could have locally or completely different height from the height of the spring 502, the depth of the compensation groove is defined preferably based on the thickness of the spring 502, since the need for correction primarily rises from tilt in the spring axis.

FIG. 5b illustrates top view of a primary spring structure 502 with a quadrature compensation groove 505. The suspension structure 501 is connected to the main seismic mass 504 of the device by a double-ended spring 502. The distance of the groove 530 from the end of the primary string is presented also in this illustration. The size, in example length 550 and width 560 of the compensation groove are further parameters which have effect on the amount of quadrature compensation caused by the compensation groove. However, the effect of these parameters is weaker as compared to the distance 530 and depth 540 parameters mentioned above. Often the length 550 and width 560 parameters are chosen based on manufacturability rather than for amount of quadrature compensation. It should be understood that while a specific measure, such as depth, width or length of the groove may be specified, these measures may vary in an actual MEMS product within the manufacturing tolerances without departing from the scope.

While FIG. 5b shows a compensation groove which extends approximately equal distance away from the primary axis of the rotary motion 520 on each side of the axis, the groove may also be made asymmetric in relation to the primary axis 520, so that the groove extends different distance from the axis on each side.

Figure 6:
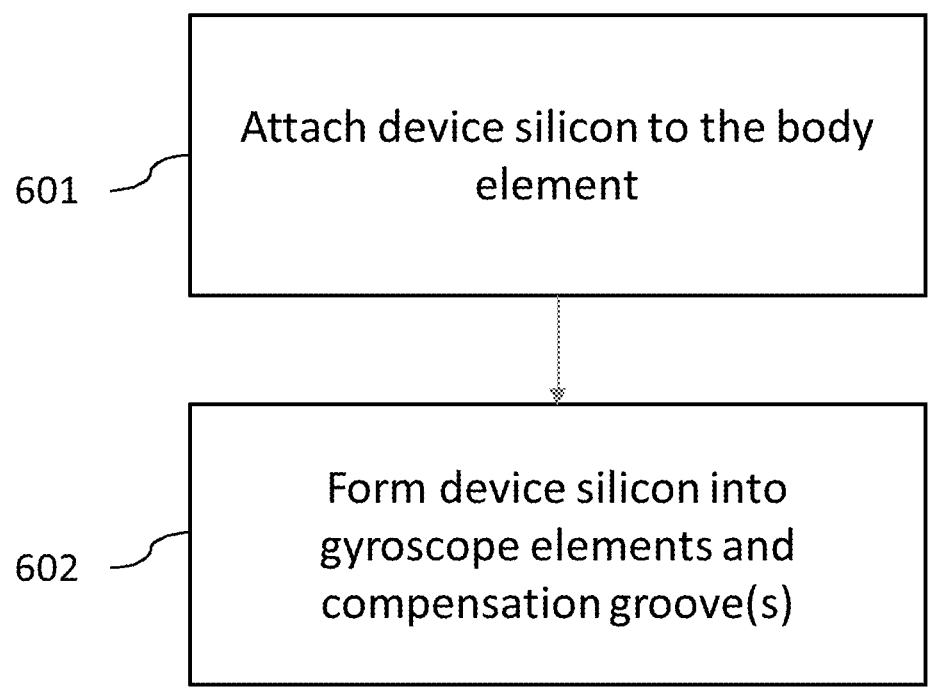
FIG. 6 describes a manufacturing process of a gyroscope structure.

FIG. 6 describes the main process phases of an exemplary manufacturing process for the gyroscope structure. Typically a large number of devices are manufactured simultaneously on a silicon disc. While the silicon disc is relatively large in diameter, the etching process may produce non-idealities, such as inclination of groove walls in relation to the normal of the disk. As this inclination is one cause of quadrature error, the inclination of the walls creates quadrature error that is distributed over the disc in known manner, and thus the error can be compensated using predefined compensation structures which may be created already during the manufacturing process of the gyroscope.

In the presented solution, the quadrature compensation grooves are designed to the seismic masses that compensate for the quadrature error. The grooves may be created using the same manufacturing process as the gyroscope structure, and they may share one or more manufacturing steps. Such sharing of manufacturing steps is beneficial for both savings in manufacturing time and cost and also in the quality of the product and effective gain of the product process, since some sources of potential errors caused by the process may be reduced or even eliminated.

In an exemplary DRIE based etching process, the gyroscope device is created on a silicon disc/silicon wafer that may be called "device silicon". First, the device silicon is attached to the body element in process 601.

The device silicon may be attached to a supporting body element in an early phase of the manufacturing process, so that the more robust body element may support the thin device silicon while the manufacturing steps are performed for forming the gyroscope structures on the device silicon. The body element and the device silicon may be attached so that the locations of the support structures are the same for a device under manufacturing and for a final product. The body element may also have patterns, i.e. cavities or basins for providing free room needed for the gyroscope element movements. The body element and the device silicon may be attached to each other e.g. by fusion bonding two silicon wafers or by growing polysilicon or epitaxial silicon on the body element. Preferably, the device silicon is attached to the body element before the device silicon is patterned.

The device silicon is then processed for forming the gyroscope elements and the compensation grooves in process 602, where the creation of gyroscope elements and compensation grooves preferably share at least one common manufacturing step, such as laying a photoresist pattern and/or etching. In case a groove should be created on the bottom side of the device silicon, it may be that steps of manufacturing process, such as an etching is then needed to be performed on the bottom side of the device silicon, which would require several additional process steps, at least patterning and etching. With the bottom side we refer to the side of the device silicon which faces towards the body structure. Such further patterning process may be more difficult to position precisely in relation to the structure later created from the opposite (top) side of the device silicon, so that the location of the compensation groove, or any other structure created under the device silicon may become poorly positioned, and not fulfilling its intended purpose properly. While the pattern under the device wafer would be made separately to the top patterning, the control of the location of the grooves would be more difficult in respect to the location of the seismic body, suspension structure and spring structures. Therefore, a device structure which enables creating the mechanical compensation grooves simultaneously with the other structural elements, in example through using common resist layer(s) for defining the compensation grooves and other device structures for etching process, is a significant improvement.

Compensation grooves may be formed to the seismic mass before, during or after the main gyroscope etching is done, i.e. when the device silicon is formed into gyroscope elements, the gyroscope elements comprising one or more seismic masses, frames, springs, supporting structures such as i.e. anchors, and/or detection combs. Single or multistage etching may be used for compensation groove formation. Multistage etching may be beneficial when there are different depths of etched patterns needed in the device. In example, a two-stage etching process allows creating or forming compensation grooves with suitable dimensions for the purpose. Although we have mainly used DRIE etching process as an example, any other suitable manufacturing methods can be used for creating or forming the compensation grooves as known by a man skilled in the art. An example of such alternative process is surface micromachining, where thin films are patterned on top of a substrate wafer.

It is apparent to a person skilled in the art that as technology advanced, the basic idea of the invention can be implemented in various ways. The invention and its embodiments are therefore not restricted to the above examples, but they may vary within the scope of the claims.

The invention claimed is:

1. A microelectromechanical gyroscope structure, comprising:
    a seismic mass; and
    a primary spring structure suspending the seismic mass to a body element with a suspension structure, the primary spring structure allowing a primary oscillation motion where at least part of the seismic mass rotary oscillates in a first direction about a primary axis that is aligned with the plane of the seismic mass and a secondary oscillation where at least part of the seismic mass moves in a second direction that is perpendicular to the first direction,
    wherein the primary spring structure has two ends attached to the seismic mass on the opposite sides of the suspension structure and said primary spring structure is configured for torsional motion about the primary axis that is common with the primary oscillation motion, and
    wherein a quadrature error of the seismic mass is mechanically compensated with at least one compensation groove disposed on the face of the seismic mass, which face is away from the body element, wherein the at least one compensation groove is positioned at a predefined distance from either end of the primary spring structure.

2. A microelectromechanical gyroscope structure according to claim 1, wherein the at least one compensation groove is formed as elongated quadrangle shape, orthogonal to the primary axis.

3. A microelectromechanical gyroscope structure according to claim 1, wherein the at least one compensation groove extends predefined distances away from the primary axis at opposite sides of the primary axis, and wherein the predefined distances are essentially equal to each other or wherein the predefined distances are different from each other.

4. A microelectromechanical gyroscope structure according to claim 1, wherein a depth of the compensation groove within the seismic mass is defined as portion of a thickness of the primary spring structure.

5. A microelectromechanical gyroscope structure according to claim 1, wherein a depth of the compensation groove is essentially half of a thickness of the primary spring structure.

6. A microelectromechanical gyroscope structure according to claim 1, wherein a depth of the compensation groove is different on different sides of the primary axis.

7. A microelectromechanical gyroscope structure according to claim 1, wherein the quadrature error is further electrically compensated using at least one electrical quadrature compensation structure placed near an end of the seismic mass away from the primary axis of the seismic mass.

8. A microelectromechanical gyroscope comprising at least two microelectromechanical gyroscope structures according to claim 1, attached to a common body element, the at least two gyroscope structures having a common primary axis.

9. The microelectromechanical gyroscope structure according to claim 1, wherein the primary spring structure is double-ended, and the parts of the primary spring structure are directly attached to the suspension structure on the opposite sides of the suspension structure.

10. A method of manufacturing a microelectromechanical gyroscope structure, the structure comprising a seismic mass and a primary spring structure suspending the seismic mass to a body element with a suspension structure to allow a primary oscillation motion where at least part of the seismic mass rotary oscillates in a first direction about a primary axis that is aligned with the plane of the seismic mass and a secondary oscillation where at least part of the seismic mass moves in a second direction that is perpendicular to the first direction, the manufacturing method comprising:
  forming by at least one of etching and surface micromachining the primary spring structure that is attached to the seismic mass on the opposite sides of the suspension structure, wherein said primary spring structure is configured for torsional motion about the primary axis that is common with the primary oscillation motion; and
  forming by at least one of etching and surface micromachining at least one compensation groove for mechanically compensating a quadrature error of the seismic mass, wherein the compensation groove is on the face of the seismic mass that is exposed to the main processing steps and away from the body element, wherein the at least one compensation groove is positioned at a predefined distance from either end of the primary spring structure.

11. A method for manufacturing a microelectromechanical gyroscope structure according to claim 10, wherein the compensation groove is formed as elongated quadrangle shape, orthogonal to the primary axis of the primary oscillation motion.

12. A method for manufacturing a microelectromechanical gyroscope structure according to claim 10, wherein the compensation groove extends predefined distances away from the primary axis at opposite sides of the primary axis, wherein the predefined distances are essentially equal to each other or wherein the predefined distances are different from each other.

13. A method for manufacturing a microelectromechanical gyroscope structure according to claim 10, wherein the depth of the compensation groove within the seismic mass is defined as portion of a thickness of the primary spring structure.

14. A method for manufacturing a microelectromechanical gyroscope structure according to claim 10, wherein a depth of the compensation groove is essentially half of a thickness of the primary spring structure.

15. A method for manufacturing a microelectromechanical gyroscope structure according to claim 10, wherein a depth of the compensation groove is different on different sides of the primary axis.

16. A method for manufacturing a microelectromechanical gyroscope structure according to claim 10, wherein the compensation groove is formed by at least one of etching and surface micromachining with a process performed only on the face of the seismic mass that is away from the body element.

17. A method for manufacturing a microelectromechanical gyroscope structure according to claim 10, further comprising etching of the compensation groove, said etching comprising at least one common etching phase with the etching of the seismic mass structure or the primary spring structure or a sensing comb structure or an electrical compensation structure.

18. A method for manufacturing a micromechanical gyroscope, said method comprising forming by at least one of etching and surface micromachining at least two microelectromechanical gyroscope structures according to the method of claim 10, wherein said gyroscope structures are attached to the same body element and have a common primary axis.

* * * * *